United States Patent
Christensen et al.

(10) Patent No.: US 9,789,678 B1
(45) Date of Patent: Oct. 17, 2017

(54) CLEAVING DEVICE

(71) Applicant: International Business Machines Corporation, Armonk, NY (US)

(72) Inventors: Jeffrey W. Christensen, Katy, TX (US); Phillip E. Christensen, Houston, TX (US); John R. Harris, Houston, TX (US); Yu Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/156,592

(22) Filed: May 17, 2016

(51) Int. Cl.
  B32B 38/10 (2006.01)
  B32B 43/00 (2006.01)

(52) U.S. Cl.
  CPC ............ *B32B 43/006* (2013.01); *B32B 38/10* (2013.01); *Y10T 83/0414* (2015.04); *Y10T 156/1153* (2015.01); *Y10T 156/1184* (2015.01); *Y10T 156/1911* (2015.01); *Y10T 156/1961* (2015.01); *Y10T 156/1967* (2015.01)

(58) Field of Classification Search
  CPC . B32B 38/10; B32B 43/006; Y10T 156/1153; Y10T 156/1184; Y10T 156/1911; Y10T 156/1961; Y10T 156/1967; Y10T 83/0414
  USPC ............ 156/711, 717, 752, 761, 762; 83/16; 30/140
  See application file for complete search history.

(56) References Cited

U.S. PATENT DOCUMENTS

| | | | |
|---|---|---|---|
| 1,487,547 A * | 3/1924 | Dow | F25C 5/14 30/140 |
| 2,032,688 A * | 3/1936 | Dart | A01G 3/00 219/201 |
| 3,632,973 A | 1/1972 | O'Keefe | |
| 3,809,520 A * | 5/1974 | Wilk | A47J 43/282 30/140 |
| 3,895,214 A | 7/1975 | Winter | |
| 4,034,202 A | 7/1977 | Vandermark | |
| 4,046,148 A * | 9/1977 | Meador | A61B 17/3201 219/227 |
| 5,107,095 A | 4/1992 | Derbyshire | |
| 5,145,101 A | 9/1992 | Brown et al. | |
| 5,147,081 A | 9/1992 | Kim | |

(Continued)

OTHER PUBLICATIONS

Geren et al., "Automated Removal and Replacement of Through-Hole Components in Robotic Rework," IEEE Transactions on Components, Packaging, and Manufacturing Technology—Part C, vol. 20, No. 3, Jul. 1997, pp. 236-248, © 1997 IEEE.

*Primary Examiner* — Mark A Osele
*Assistant Examiner* — Nickolas Harm
(74) *Attorney, Agent, or Firm* — Erik K. Johnson

(57) ABSTRACT

An embodiment of the invention may include a cleaving apparatus. The cleaving apparatus may include a first arm having a first cleaving wedge and a second arm having a second cleaving wedge. The first cleaving wedge may include a first front surface and a first bottom surface, where the first front surface is oriented away from the first bottom surface. The second cleaving wedge may include a second front surface and a second bottom surface, where the second front surface is oriented away from the second bottom surface. The first arm and the second arm may be arranged to move with respect to each other. Further, the cleaving apparatus may include a heating apparatus located in the first cleaving wedge.

20 Claims, 13 Drawing Sheets

(56) References Cited

U.S. PATENT DOCUMENTS

| | | | | |
|---|---|---|---|---|
| 5,309,640 | A * | 5/1994 | Caron | B26B 21/48 |
| | | | | 219/227 |
| 5,766,166 | A * | 6/1998 | Hooven | A61B 18/1445 |
| | | | | 606/45 |
| 5,792,137 | A * | 8/1998 | Carr | A61B 18/1442 |
| | | | | 606/29 |
| 5,837,296 | A * | 11/1998 | Virkler | A47J 43/282 |
| | | | | 425/277 |
| 5,951,549 | A * | 9/1999 | Richardson | A61B 18/1445 |
| | | | | 606/45 |
| 6,060,695 | A * | 5/2000 | Harle | B26B 13/24 |
| | | | | 219/227 |
| 6,221,740 | B1 | 4/2001 | Bryan et al. | |
| 6,313,439 | B1 * | 11/2001 | Fischbach | B26B 13/24 |
| | | | | 132/201 |
| 6,607,113 | B2 | 8/2003 | Cilia et al. | |
| 6,735,871 | B1 * | 5/2004 | Todd-Russell | B26B 13/22 |
| | | | | 30/140 |
| 2007/0107746 | A1 * | 5/2007 | Randolph | A45D 1/04 |
| | | | | 132/118 |
| 2008/0235952 | A1 * | 10/2008 | Standiform | B26B 27/00 |
| | | | | 30/140 |

\* cited by examiner

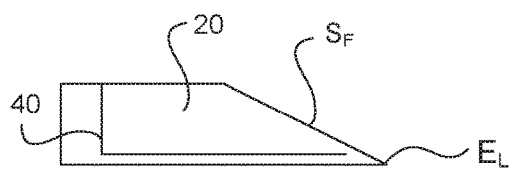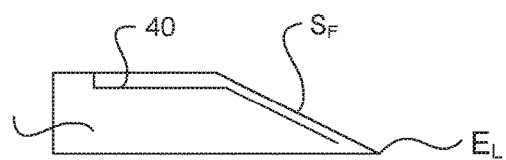
FIG. 7A          FIG. 7B
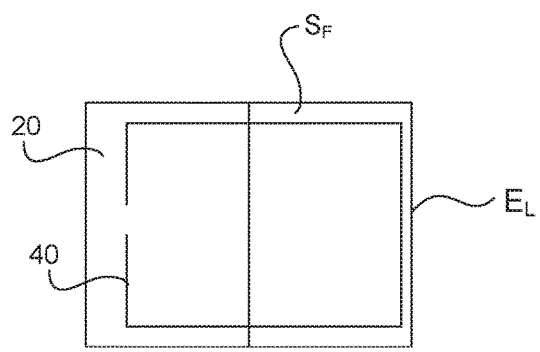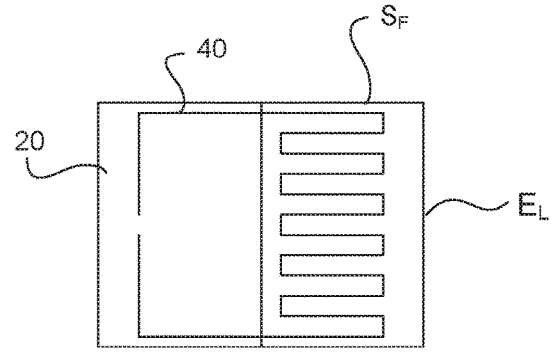
FIG. 7C          FIG. 7D

CLEAVING DEVICE

BACKGROUND

The present invention relates to separating adhered objects, and more specifically, to a cleaving tool for separating adhered objects.

The use of adhesives offers many advantages over binding techniques such as sewing, mechanical fastening, thermal bonding, etc. These include the ability to bind different materials together, to distribute stress more efficiently across the joint, the cost effectiveness of an easily mechanized process, an improvement in aesthetic design, and increased design flexibility.

BRIEF SUMMARY

An embodiment of the invention may include a cleaving apparatus. The cleaving apparatus may include a first arm having a first cleaving wedge and a second arm having a second cleaving wedge. The first cleaving wedge may include a first front surface and a first bottom surface, where the first front surface is oriented away from the first bottom surface. The second cleaving wedge may include a second front surface and a second bottom surface, where the second front surface is oriented away from the second bottom surface. The first arm and the second arm may be arranged to move with respect to each other. Further, the cleaving apparatus may include a heating apparatus located in the first cleaving wedge.

BRIEF DESCRIPTION OF THE DRAWINGS

FIGS. 7A and 7B represent a cross-sectional view depicting multiple arrangements of the heating element in the cleaving wedge, according to an example embodiment;

FIGS. 7C and 7D represent a top view depicting multiple arrangements of the heating element in the cleaving wedge, according to an example embodiment;

Figure 1:
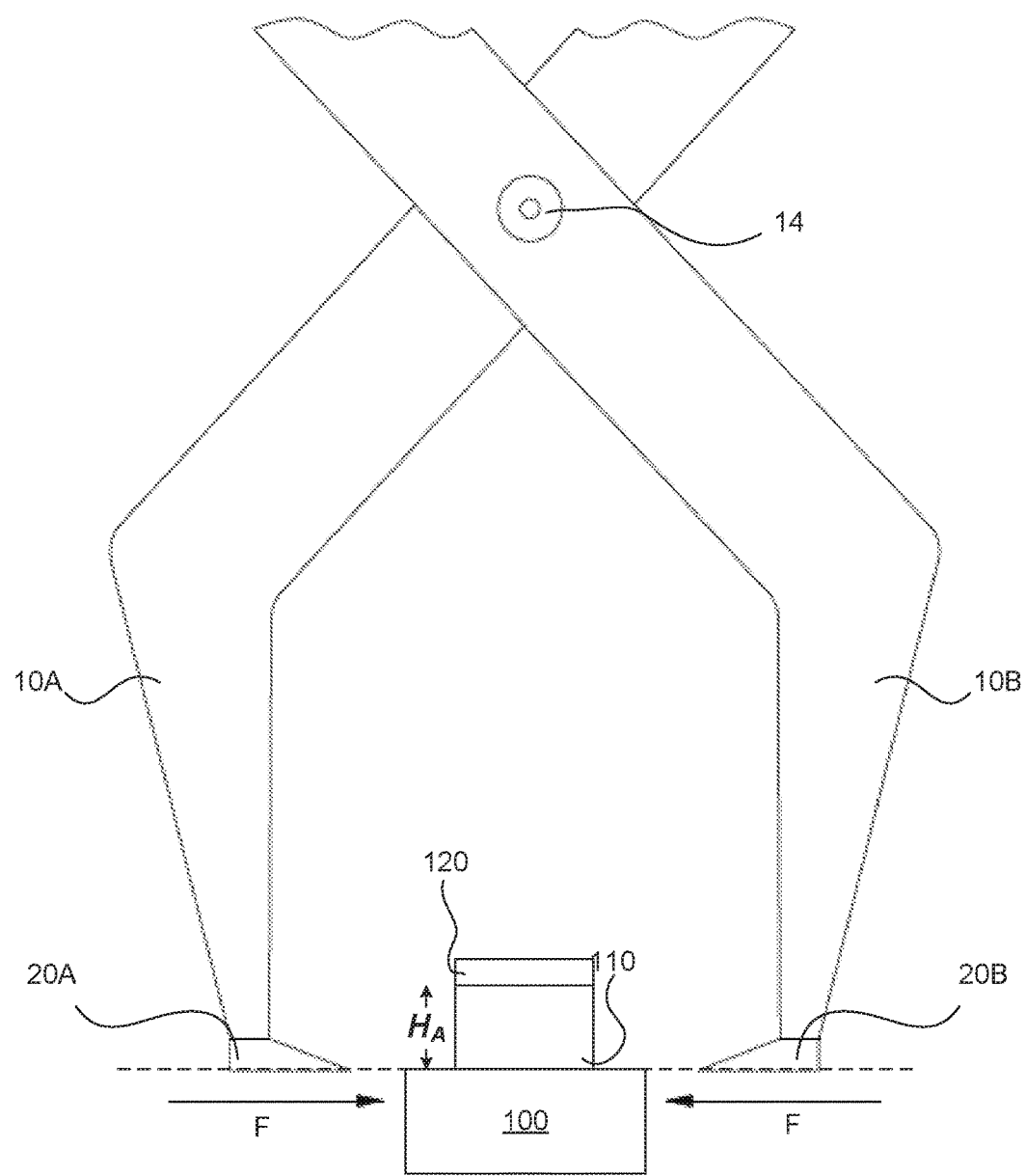
FIG. 1 represents a side view depicting a generic embodiment of a cleaving tool, according to an example embodiment.

Elements of the figures are not necessarily to scale and are not intended to portray specific parameters of the invention. For clarity and ease of illustration, dimensions of elements may be exaggerated. The detailed description should be consulted for accurate dimensions. The drawings are intended to depict only typical embodiments of the invention, and therefore should not be considered as limiting the scope of the invention. In the drawings, like numbering represents like elements.

DETAILED DESCRIPTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will convey the scope of this disclosure to those skilled in the art. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Many common fabrication techniques involve securing two objects using an adhesive layer between the objects. Often times the adhesive layer is chosen in an attempt to permanently secure the two objects together. And while this adhesive layer selection may be advantageous for typical usage of the overall product, there may be instances where separation of the joined objects is either desired, or necessary. In such instances, separation of the two objects, without physically damaging either of the objects, may be required so that one or both of the objects may be reused.

FIG. 1 depicts a high level example of the mechanism of action of the cleaving tool 1. Cleaving tool 1 includes a first arm 10A having a first cleaving wedge 20A, and a second arm 10B having a second cleaving wedge 20B. In the pictured embodiment, the first arm 10A is joined to the second arm 10B by a pivot connection 14.

Additionally, FIG. 1 depicts a first object 100 bound to a second object 120 by an adhesive layer 110. The adhesive layer 110 may be any type of adhesive, such as, for example, drying adhesives (solvent based adhesives containing a mixture of ingredients that harden as the solvent evaporates, such as white glue, and rubber cement), hot adhesives (adhesives applied in molten form which solidify when cooling to ambient, such as thermoplastics), and reactive adhesives (adhesives containing one or more components which chemically react with each other forming, for example, crosslinked polymers such as acrylics, urethanes, and epoxies). First object 100 and second object 120 may be any materials or object capable of being joined by adhesive layer 110. The adhesive layer may have a thickness of $H_A$. In an exemplary embodiment, first object 100 may be a semiconductor substrate, adhesive layer 110 may be an epoxy adhesive and second object 120 may be a heat sink.

Still referring to FIG. 1, cleaving tool 1 is arranged such that the first arm 10A and the second arm 10B move with respect to each other when a force, F, is applied. Further, cleaving tool 1 is arranged such that when first arm 10A and the second arm 10B are sufficiently close, first cleaving wedge 20A and second cleaving wedge 20B are in contact with each other, or alternatively overlapping each other (e.g. first cleaving wedge 20A is above second cleaving wedge 20B). This may allow the first cleaving wedge 20A and second cleaving wedge 20B to traverse through the adhesive layer 110 in order to separate the first object 100 from the second object 120.

First cleaving wedge 20A and second cleaving wedge 20B, or referred to generally as cleaving wedge 20, are aspects of the cleaving tool 1 that are used to separate the adhesive layer. The cleaving wedge 20 may be any rigid, or semi-rigid, material capable of being driven through the adhesive layer. Materials for the cleaving wedge 20 may be selected with regards to the specific implementation used (and described in more detail below), such as materials with good thermal conductivity, or materials resistant to chemical degradation. Materials such as metals, metal alloys, molded polymers, polymer composites or combinations thereof may be selected depending on the application.

First arm 10A and second arm 10B, or referred to generally as arm 10, may be any rigid structure capably of moving the cleaving wedge 20 through the adhesive layer 110. Arm 10 may be a single solid structure (not shown), or multiple structures (as illustrated), attached to the cleaving wedge 20. Arm 10 may be made of any material capable of sustaining the forces necessary to propel cleaving wedge 20 through the adhesive layer 110, such as, for example, metals, metal alloys, molded polymers, polymer composites or combinations thereof may be selected depending on the application.

Pivot connection 14 is an apparatus that attaches the first arm 10A and the second arm 10B to each other, and allows them to move with respect of each other. In one example, pivot connection 14 may be pin.

Figure 2A:
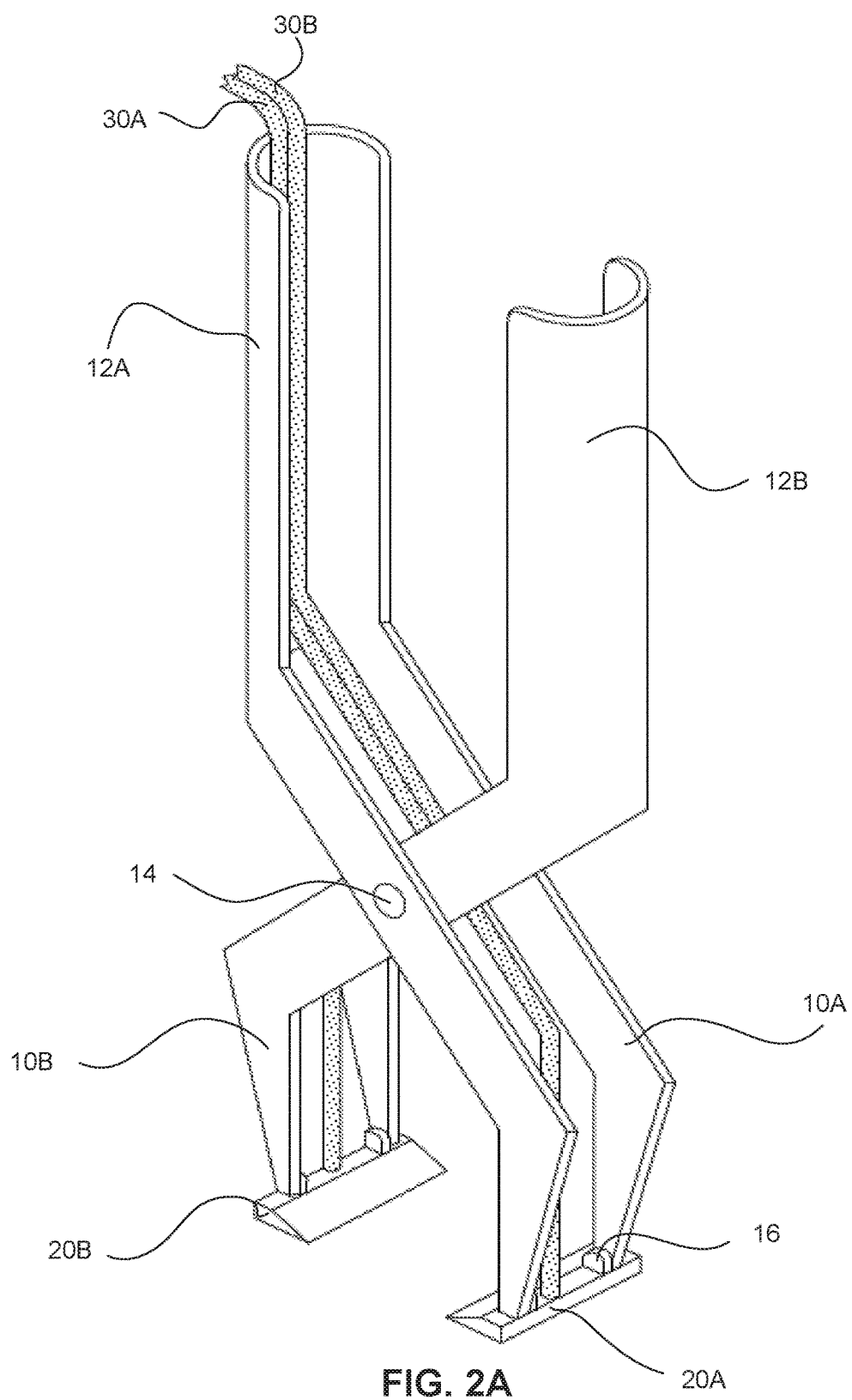
FIG. 2A represents a 3-D view depicting a first embodiment of a cleaving tool, according to an example embodiment.
Figure 2B:
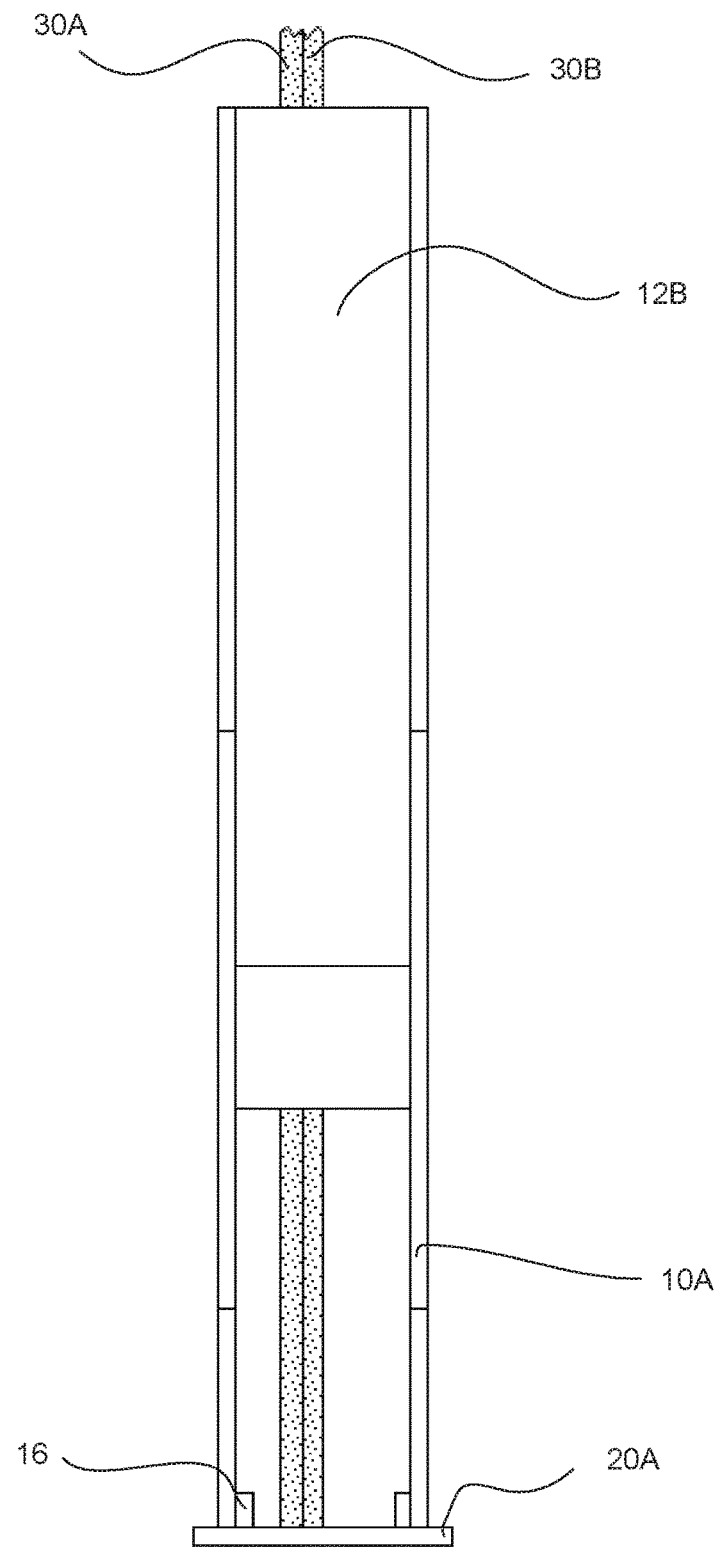
FIG. 2B represents a side view depicting a first embodiment of a cleaving tool, according to an example embodiment.

Referring to FIGS. 2A and 2B, a first embodiment of cleaving tool 1 is illustrated. Cleaving tool 1 includes a first arm 10A having a first cleaving wedge 20A attached by a head pivot 16, and a second arm 10B having a second cleaving wedge 20B attached by a head pivot 16. In the pictured embodiment, the first arm 10A is joined to the second arm 10B by a pivot connection 14. In the pictured embodiment, above the pivot connection 14, first arm 10A includes a first handle 12A, and second arm 10B includes a second handle 12B. Further, a first electrical connection 30A and second electrical connection 30B, generally referred to as electrical connection 30, leading to the first cleaving wedge 20A and second cleaving wedge 20B respectively, enter through either the first handle 12A, second handle 12B (not shown), or both (not shown). First electrical connection 30A and second electrical connection 30B are connected to an electrical power source (not shown) and provide current to an electrical heating element 40 located in the first cleaving wedge 20A and second cleaving wedge 20B. In an alternate embodiment, an enclosed fluid conveying system may replace the electrical heating element, which may enable a heat transfer fluid to flow through each cleaving wedge. In such embodiments, a fluid supply and fluid return (similar to those used in FIGS. 3A and 3B) are envisioned, however orientation of the fluid conveying system in the cleaving wedges is similar to that of the electrical heating system, and the aspects of the heating element discussed below should be applicable to the fluid conveying system.

Figure 3A:
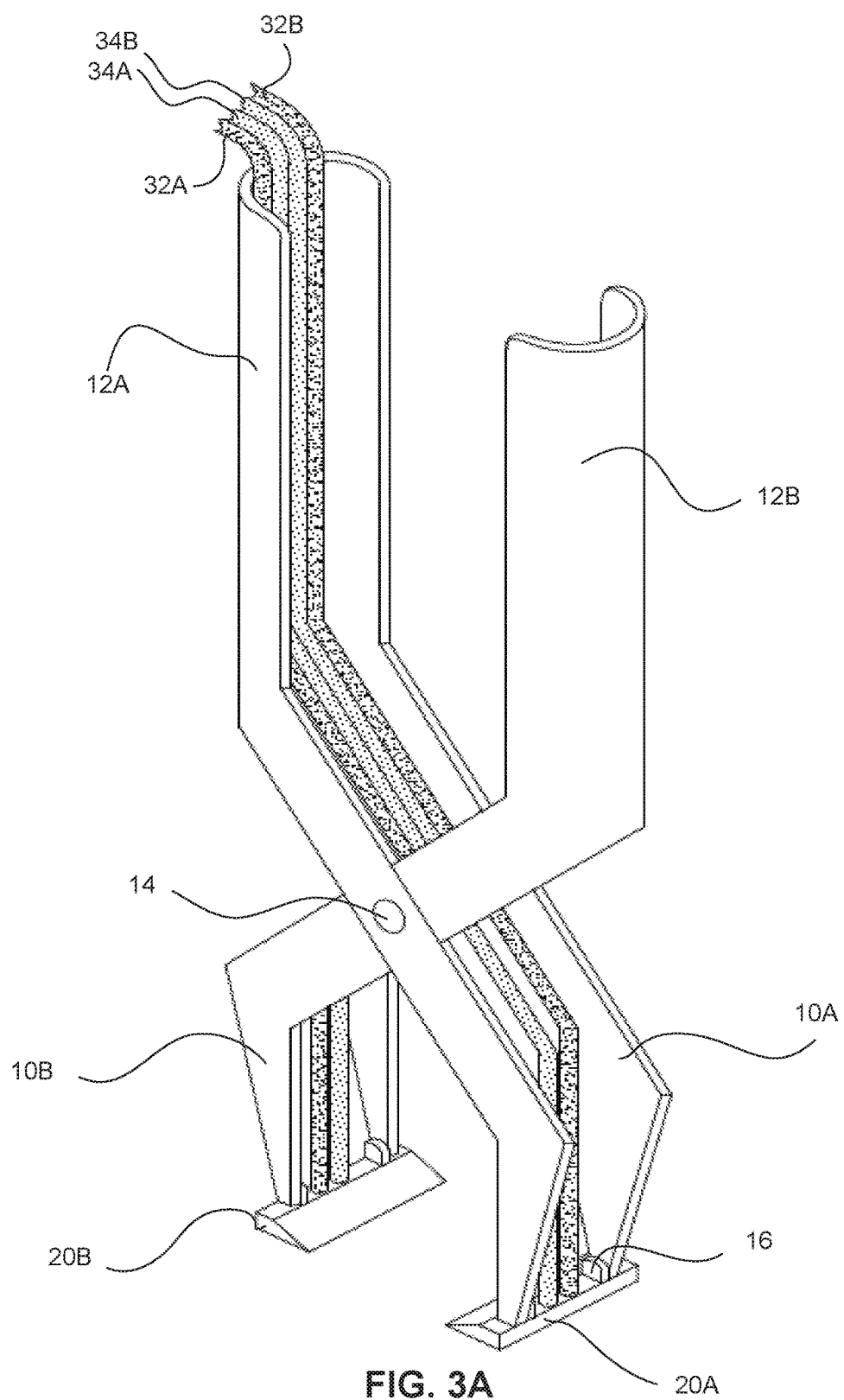
FIG. 3A represents a 3-D view depicting a second embodiment of a cleaving tool, according to an example embodiment.
Figure 3B:
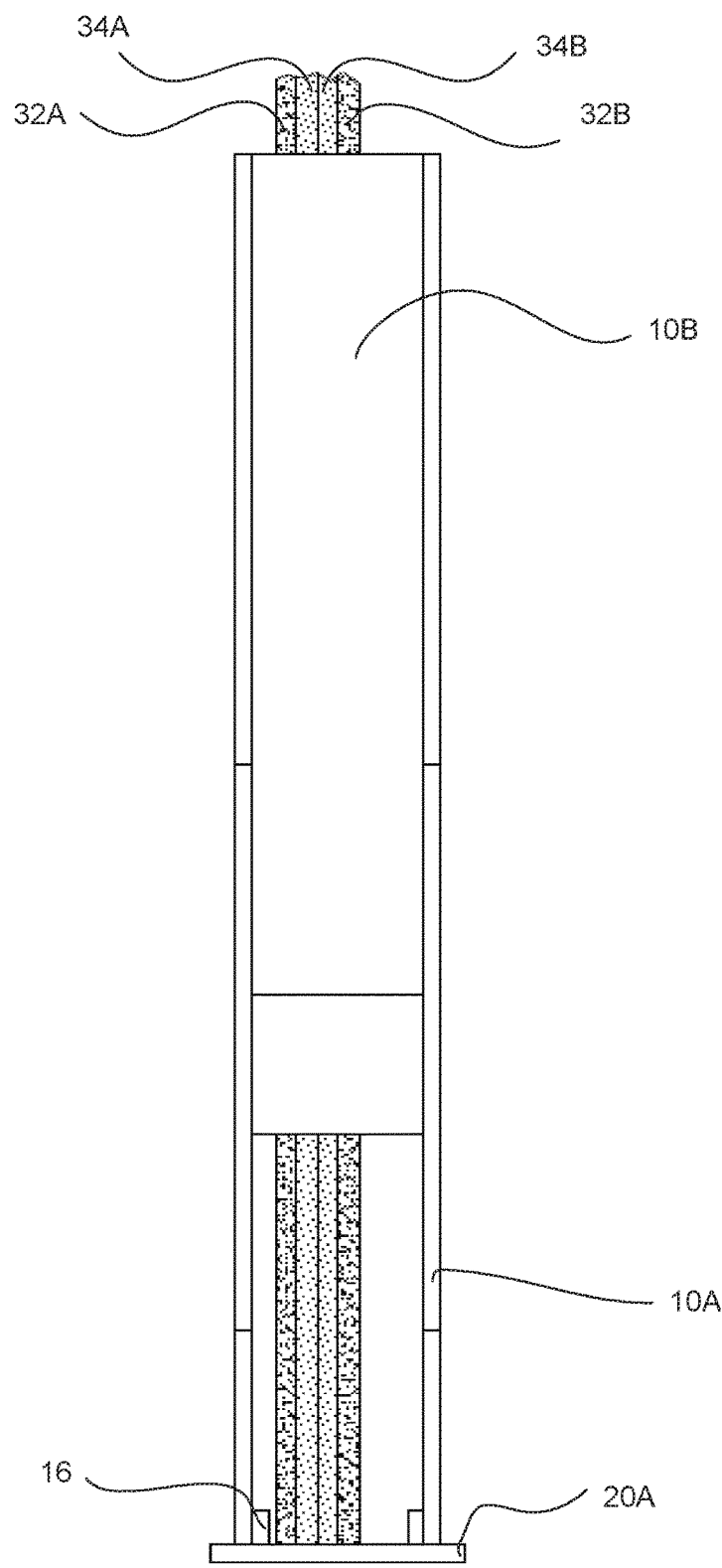
FIG. 3B represents a side view depicting a second embodiment of a cleaving tool, according to an example embodiment.

Referring to FIGS. 3A and 3B, a second embodiment of cleaving tool 1 is illustrated. Cleaving tool 1 includes a first arm 10A having a first cleaving wedge 20A attached by a head pivot 16, and a second arm 10B having a second cleaving wedge 20B attached by a head pivot 16. In the pictured embodiment, the first arm 10A is joined to the second arm 10B by a pivot connection 14. In the pictured embodiment, above the pivot connection 14, first arm 10A includes a first handle 12A, and second arm 10B includes a second handle 12B. Further, a first solvent supply 32A leading to the first cleaving wedge 20A and a first solvent return 34A returning from the first cleaving wedge 20A, a second solvent supply 32B leading to the second cleaving wedge 20B and a second solvent return 34B returning from the second cleaving wedge 20B enter through either the first handle 12A, second handle 12B (not shown), or both (not shown). First solvent supply 32A and second solvent supply 32B, generally referred to as solvent supply 32, are connected to a solvent source (not shown), which is configured to supply solvent to the first cleaving wedge 20A and second cleaving wedge 20B. The solvent source may use a pump, or gravity feed system, to convey solvent to the cleaving wedges. First solvent return 34A and second solvent return 34B, generally referred to as solvent return 34, are connected to a solvent return (not shown), which is configured to collect solvent from the first cleaving wedge 20A and second cleaving wedge 20B. The solvent return may use a vacuum pump, or gravity return system, to convey solvent from the cleaving wedges.

First handle 12A and second handle 12B, generally referred to as handle 12, are extensions of first arm 10A a second arm 10B, respectively. Handle 12 may be made of any material capable of sustaining the forces necessary to propel cleaving wedge 20 through the adhesive layer 110, such as, for example, metals, metal alloys, molded polymers, polymer composites or combinations thereof may be selected depending on the application. Additionally, handle 12 may have a handle covering (not shown) applied to the outside of the handle, which aid a user in gripping the cleaving tool 1, or insulate the user from heat.

Head pivot 16 attaches arm 10 to cleaving wedge 20. Head pivot 16 should be capable of sustaining the forces required to transmit the force from arm 10 to cleaving wedge 20, which force cleaving wedge 20 through the adhesive layer 110. In some embodiments, head pivot 16 may allow for the cleaving wedge 20 to rotate with respect to the point of attachment to arm 10. In the illustrated embodiment, head pivot 16 is depicted as being permanently fixed to cleaving wedge 20, and temporarily affixed to arm 10, however embodiments are contemplated with the opposite arrangement.

Figure 4:
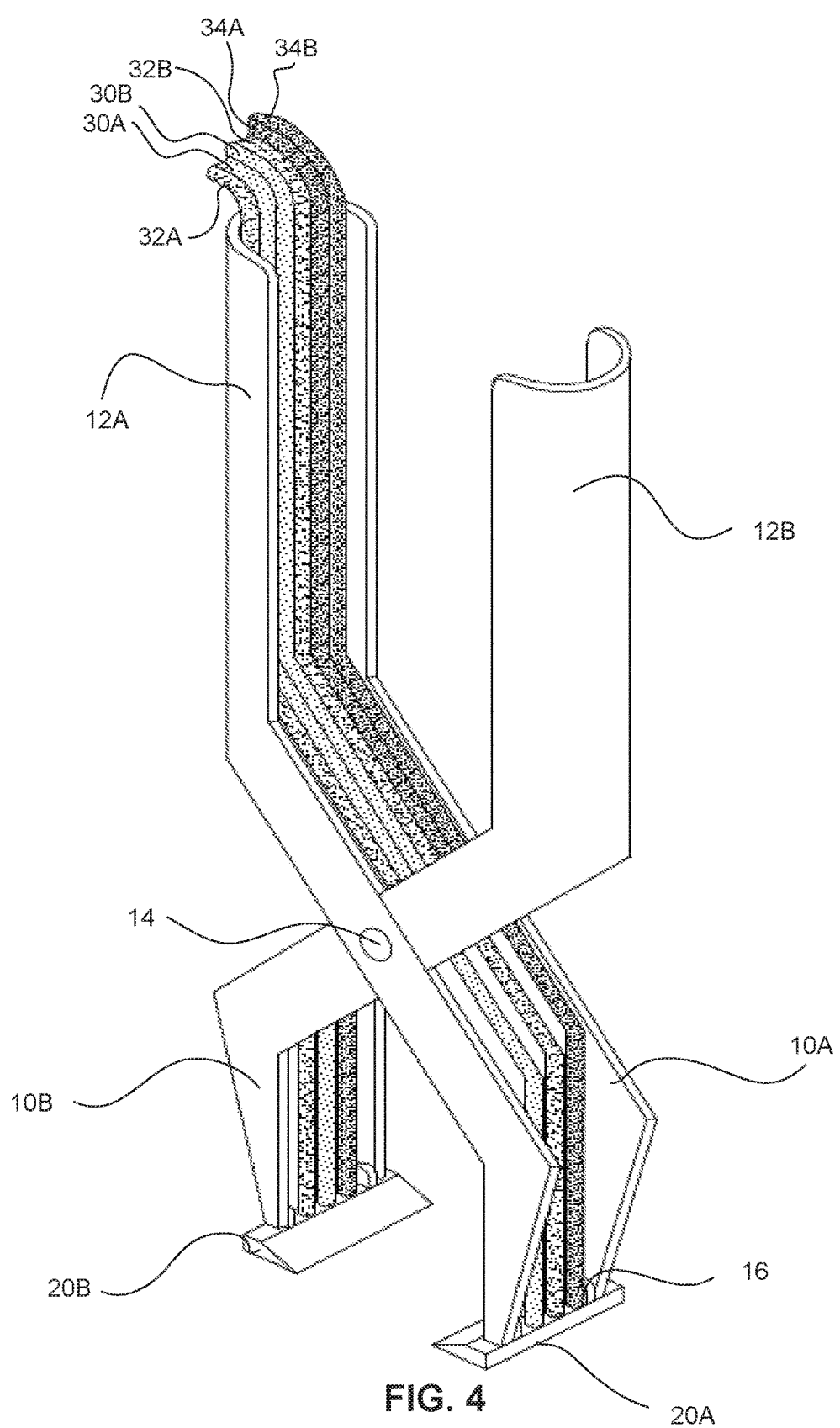
FIG. 4 represents a 3-D view depicting a third embodiment of a cleaving tool, according to an example embodiment.

Referring to FIG. 4, a third embodiment of cleaving tool 1 is illustrated. Cleaving tool 1 includes a first arm 10A having a first cleaving wedge 20A attached by a first head pivot 16A, and a second arm 10B having a second cleaving wedge 20B attached by a second head pivot 16B. In the pictured embodiment, the first arm 10A is joined to the second arm 10B by a pivot connection 14. In the pictured embodiment, above the pivot connection 14, first arm 10A includes a first handle 12A, and second arm 10B includes a second handle 12B. Further, a first solvent supply 32A leading to the first cleaving wedge 20A and a first solvent return 34A returning from the first cleaving wedge 20A, a second solvent supply 32B leading to the second cleaving wedge 20B and a second solvent return 34B returning from the second cleaving wedge 20B enter through either the first handle 12A, second handle 12B (not shown), or both (not shown). Further, a first electrical connection 30A and second electrical connection 30B, leading to the first cleaving wedge 20A and second cleaving wedge 20B respectively, enter through either the first handle 12A, second handle 12B (not shown), or both (not shown). First electrical connection 30A and second electrical connection 30B are connected to an electrical power source (not shown) and provide current to an electrical heating element 40 located in the first cleaving wedge 20A and second cleaving wedge 20B. First solvent supply 32A and second solvent supply 32B are connected to a solvent source (not shown), which is configured to supply solvent to the first cleaving wedge 20A and second cleaving wedge 20B. The solvent source may use a pump, or gravity feed system, to convey solvent to the cleaving wedges. First solvent return 34A and second solvent return 34B are connected to a solvent return (not shown), which is configured to collect solvent from the first cleaving wedge 20A and second cleaving wedge 20B. The solvent return may use a vacuum pump, or gravity return system, to convey solvent from the cleaving wedges.

FIGS. 5A-5H depict different cross-sectional views of first cleaving wedge 20A and second cleaving wedge 20B in relation to the first object 100 bound to the second object 120 by the adhesive layer 110. FIGS. 5A-5D show arrangements whereby the first cleaving wedge 20A and second cleaving wedge 20B mirror each other, and are illustrated to show example cleaving wedge shapes. FIGS. 5E-5H show arrangements of the first cleaving wedge 20A and second cleaving wedge 20B in relation to each other, and their approximate orientation with the adhesive layer 110. In each embodiment, a front surface $S_F$ is oriented away from a bottom surface $S_B$ such that a normal of at least one portion of the front surface front surface $S_F$ forms an angle of at least 90° with a normal of the bottom surface $S_B$.

Figure 5A:
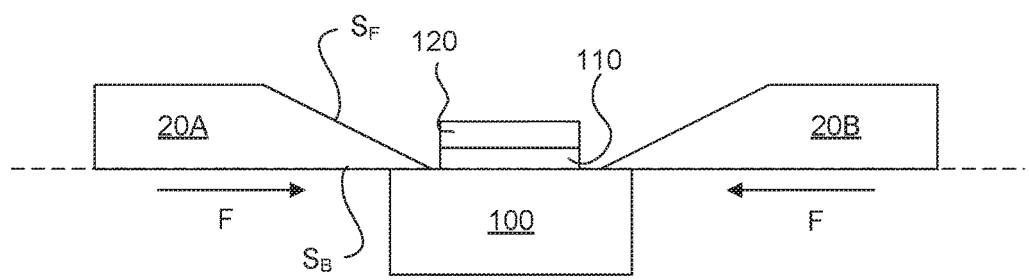
FIGS. 5A-5H represent the side view of multiple embodiments of the arrangement of the cleaving wedges, according to an example embodiment.

FIG. 5A depicts the first cleaving wedge 20A and second cleaving wedge 20B exhibiting substantially similar shapes, and descriptions of the shape of the first cleaving wedge 20A should apply to the second cleaving wedge 20B. The first cleaving wedge 20A and second cleaving wedge 20B are aligned along a plane, such that when they move with respect to each other they remain on substantially the same plane. This may be achieved when the first arm 10A and the second arm 10B are substantially similar in length. The first cleaving wedge 20A has a front surface $S_F$, and a bottom surface $S_B$. The front surface $S_F$ is inclined, meeting bottom surface $S_B$ at an angle less than 90°, more preferably at an angle less than 30° and even more preferably at an angle less than 15°. In the illustrated embodiment, the front surface $S_F$ is substantially flat. In the illustrated embodiment, the bottom surface $S_B$ is substantially parallel to the plane of cleaving, however head pivot 16 may allow the first cleaving wedge 20A to be inclined or declined with respect to the plane.

Figure 5B:
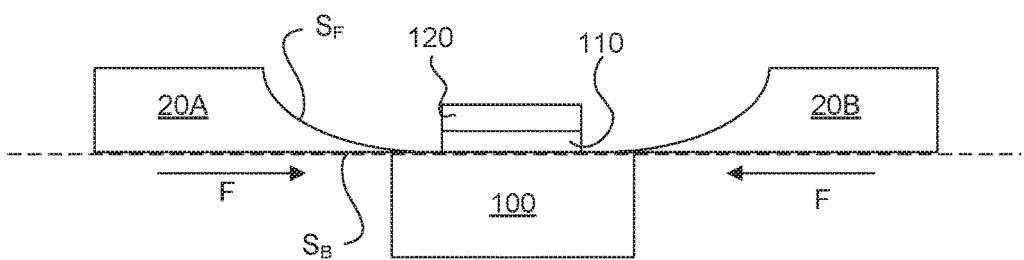

FIG. 5B depicts the first cleaving wedge 20A and second cleaving wedge 20B exhibiting substantially similar shapes, and descriptions of the shape of the first cleaving wedge 20A should apply to the second cleaving wedge 20B. The first cleaving wedge 20A and second cleaving wedge 20B are aligned along a plane, such that when they move with respect to each other they remain on substantially the same plane. This may be achieved when the first arm 10A and the second arm 10A are substantially similar in length. The first cleaving wedge 20A has a front surface $S_F$, and a bottom surface $S_B$. In the illustrated embodiment, the front surface $S_F$ is convex. In the illustrated embodiment, the bottom surface $S_B$ is substantially parallel to the plane of cleaving, however head pivot 16 may allow the first cleaving wedge 20A to be inclined or declined with respect to the plane.

Figure 5C:
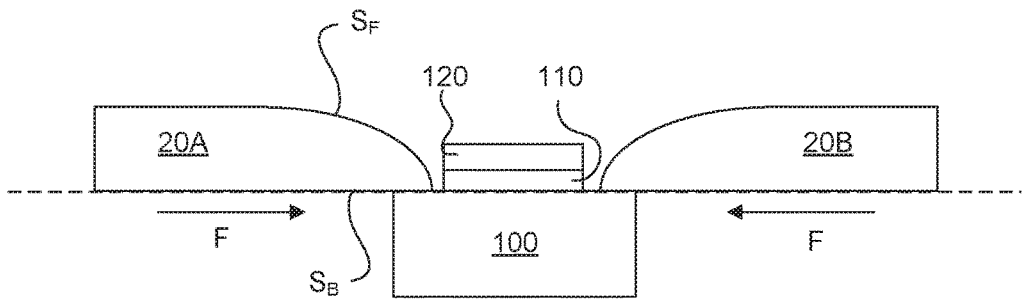

FIG. 5C depicts the first cleaving wedge 20A and second cleaving wedge 20B exhibiting substantially similar shapes, and descriptions of the shape of the first cleaving wedge 20A should apply to the second cleaving wedge 20B. The first cleaving wedge 20A and second cleaving wedge 20B are aligned along a plane, such that when they move with respect to each other they remain on substantially the same plane. This may be achieved when the first arm 10A and the second arm 10A are substantially similar in length. The first cleaving wedge 20A has a front surface $S_F$, and a bottom surface $S_B$. In the illustrated embodiment, the front surface $S_F$ is concave. In the illustrated embodiment, the bottom surface $S_B$ is substantially parallel to the plane of cleaving, however head pivot 16 may allow the first cleaving wedge 20A to be inclined or declined with respect to the plane.

Figure 5D:
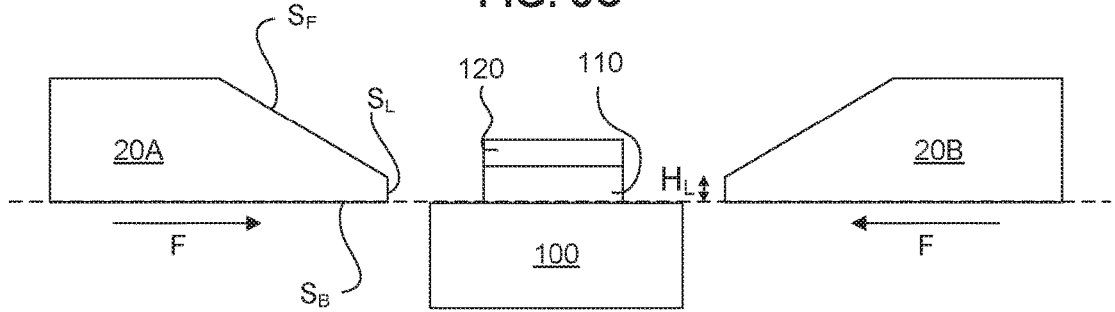

FIG. 5D depicts the first cleaving wedge 20A and second cleaving wedge 20B exhibiting substantially similar shapes, and descriptions of the shape of the first cleaving wedge 20A should apply to the second cleaving wedge 20B. The first cleaving wedge 20A and second cleaving wedge 20B are aligned along a plane, such that when they move with respect to each other they remain on substantially the same plane. This may be achieved when the first arm 10A and the second arm 10A are substantially similar in length. The first cleaving wedge 20A has a front surface $S_F$, a bottom surface $S_B$, and a leading surface $S_L$. The front surface $S_F$ is inclined, such that an angle between the front surface $S_F$ and bottom surface $S_B$ (were they to meet) is less than 90°, more preferably at an angle less than 30° and even more preferably at an angle less than 15°. Further, leading surface $S_L$ is a vertical surface connecting the front surface $S_f$ and bottom surface $S_B$. While leading surface $S_L$ is pictured as flat, a curved surface may be used, such as a convex surface. Further, in the present embodiment, leading surface $S_L$ is shown as substantially perpendicular to the bottom surface $S_B$. Leading surface $S_L$ is designed such that the height $H_L$ is less than the adhesive height $H_A$. In the illustrated embodiment, the bottom surface $S_B$ is substantially parallel to the plane of cleaving, however head pivot 16 may allow the first cleaving wedge 20A to be inclined or declined with respect to the plane.

Figure 5E:
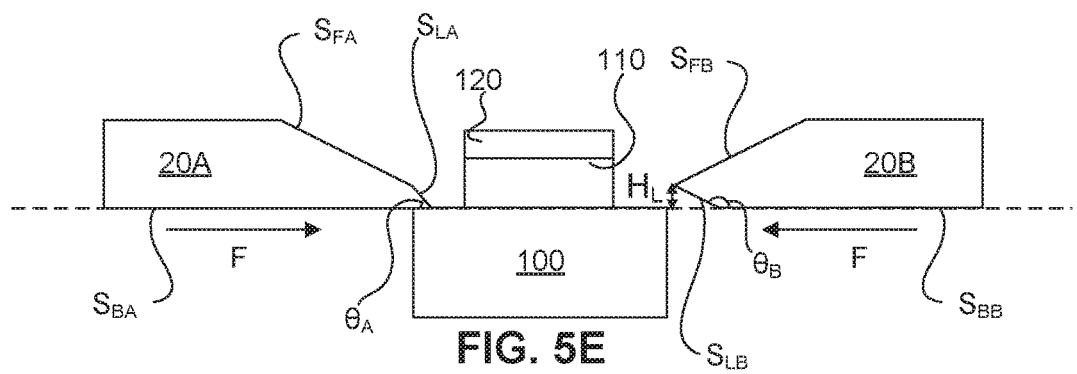

FIG. 5E depicts the first cleaving wedge 20A and second cleaving wedge 20B having different shapes conforming to similar principles. The first cleaving wedge 20A and second cleaving wedge 20B are aligned along a plane, such that when they move with respect to each other they remain on substantially the same plane. This may be achieved when the first arm 10A and the second arm 10A are substantially similar in length. The first cleaving wedge 20A has a first front surface $S_{FA}$, a first bottom surface $S_{BA}$, and a first leading surface $S_{LA}$. The first front surface $S_{FA}$ is inclined, such that an angle between the first front surface $S_{FA}$ and first bottom surface $S_{BA}$ (were they to meet) is less than 90°, more preferably at an angle less than 30° and even more preferably at an angle less than 15°. Further, first leading surface $S_{LA}$ is a surface connecting the first front surface $S_{FA}$ and first bottom surface $S_{BA}$, having a different angle of inclination from the first front surface $S_{FA}$. Further, in the present embodiment, first leading surface $S_{LA}$ is shown at a first angle $\theta_A$ to the first bottom surface $S_{BA}$. First leading surface $S_{LA}$ is designed such that the height $H_L$ is less than the adhesive height $H_A$. The second cleaving wedge 20B has a second front surface $S_{FB}$, a second bottom surface $S_{BB}$, and a second leading surface $S_{LB}$. The second front surface $S_{FB}$ is inclined, such that an angle between the second front surface $S_{FB}$ and second bottom surface $S_{BB}$ (were they to meet) is less than 90°, more preferably at an angle less than 30° and even more preferably at an angle less than 15°. Further, second leading surface $S_{LB}$ is a surface connecting the second front surface $S_{FB}$ and second bottom surface $S_{BB}$, having a different angle of inclination from the second front surface $S_{FB}$. Further, in the present embodiment, second leading surface $S_{LB}$ is shown at a second angle $\theta_B$ to the second bottom surface $S_{BB}$. Second leading surface $S_{LB}$ is designed such that the height $H_{EB}$ is less than the adhesive height $H_A$. First angle $\theta_A$ and second angle $\theta_B$ may be independently selected as any angle between 0° and 180°. In the present embodiment, first angle $\theta_A$ is shown as having an angle less than 90°, while second angle $\theta_B$ is shown as having an angle greater than 90°. This may allow the front edge of the first cleaving wedge 20A to fit underneath the front edge of the second cleaving wedge 20B. In the illustrated embodiment, the bottom surface $S_B$ is substantially parallel to the plane of cleaving, however head pivot 16 may allow the first cleaving wedge 20A to be inclined or declined with respect to the plane. In an example embodiment, the heating element, or solvent distribution may be located in the region between the leading surface and bottom surface (i.e. $\theta<90°$), or located in the region between the leading surface and front surface (i.e. $\theta>90°$).

Figure 5F:
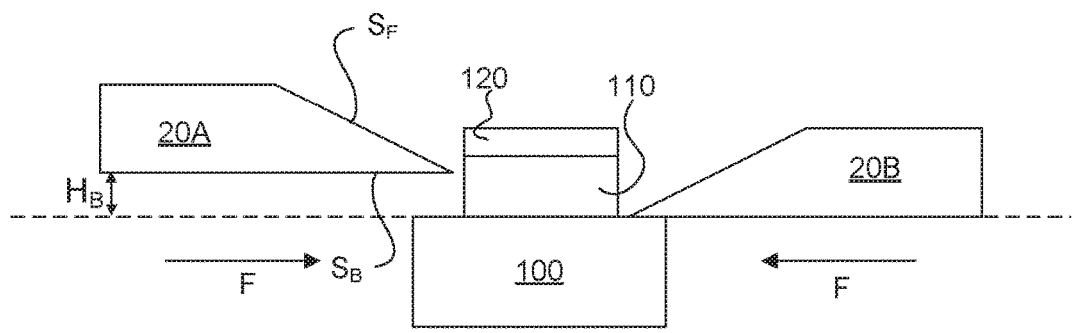

FIG. 5F depicts the first cleaving wedge 20A and second cleaving wedge 20B exhibiting substantially similar shapes, and descriptions of the shape of the first cleaving wedge 20A should apply to the second cleaving wedge 20B. The first cleaving wedge 20A has a front surface $S_F$, and a bottom surface $S_B$. The front surface $S_F$ is inclined, meeting bottom surface $S_B$ at an angle less than 90°, more preferably at an angle less than 30° and even more preferably at an angle less than 15°. In the illustrated embodiment, the front surface $S_F$ is substantially flat. In the illustrated embodiment, the bottom surface $S_B$ is substantially parallel to the plane of cleaving, however head pivot 16 may allow the first cleaving wedge 20A to be inclined or declined with respect to the plane. The first cleaving wedge 20A and second cleaving wedge 20B are staggered aligned along a plane, such that when they move with respect to each other they remain on different planes that are substantially parallel to each other. This may be achieved when the first arm 10A and the second arm 10A are different in length. The difference in the plane may be represented by base height $H_B$, which is preferably smaller than the adhesive height $H_A$.

Figure 5G:
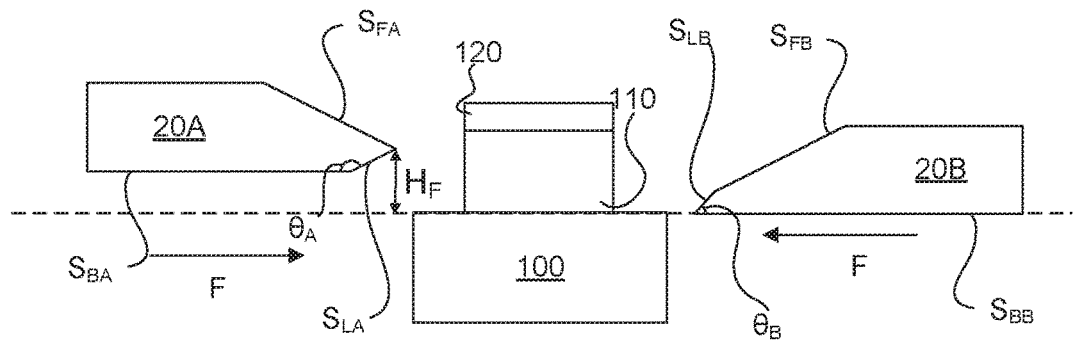

FIG. 5G depicts a combination of the embodiments shown in FIG. 5E and FIG. 5F, whereby the first cleaving wedge 20A and second cleaving wedge 20B having different shapes conforming to similar principles. The first cleaving wedge 20A has a first front surface $S_{FA}$, a first bottom surface $S_{BA}$, and a first leading surface $S_{LA}$. The first front surface $S_{FA}$ is inclined, such that an angle between the first front surface $S_{FA}$ and first bottom surface $S_{BA}$ (were they to meet) is less than 90°, more preferably at an angle less than 30° and even more preferably at an angle less than 15°. Further, first leading surface $S_{LA}$ is a surface connecting the first front surface $S_{FA}$ and first bottom surface $S_{BA}$, having a different angle of inclination from the first front surface $S_{FA}$. Further, in the present embodiment, first leading surface $S_{LA}$ is shown at a first angle $\theta_A$ to the first bottom surface $S_{BA}$. The second cleaving wedge 20B has a second front surface $S_{FB}$, a second bottom surface $S_{BB}$, and a second leading surface $S_{LB}$. The second front surface $S_{FB}$ is inclined, such that an angle between the second front surface $S_{FB}$ and second bottom surface $S_{BB}$ (were they to meet) is less than 90°, more preferably at an angle less than 30° and even more preferably at an angle less than 15°. Further, second leading surface $S_{LB}$ is a surface connecting the second front surface $S_{FB}$ and second bottom surface $S_{BB}$, having a different angle of inclination from the second front surface $S_{FB}$. Further, in the present embodiment, second leading surface $S_{LB}$ is shown at a second angle $\theta_B$ to the second bottom surface $S_{BB}$. Second leading surface $S_{LB}$ is designed such that the height $H_{EB}$ is less than the adhesive height $H_A$. First angle $\theta_A$ and second angle $\theta_B$ may be independently selected as any angle between 0° and 180°. In the present embodiment, first angle $\theta_A$ is shown as having an angle less than 90°, while second angle $\theta_B$ is shown as having an angle greater than 90°. This may allow the front edge of the first cleaving wedge 20A to fit underneath the front edge of the second cleaving wedge 20B. In the illustrated embodiment, the first bottom surface $S_{BA}$ and the second bottom surface $S_{BB}$ are substantially parallel to the plane of movement. The first cleaving wedge 20A and second cleaving wedge 20B are staggered, such that when they move with respect to each other they remain on different planes that are substantially parallel to each other. This may be achieved when the first arm 10A and the second arm 10A are different in length. Further, the first cleaving wedge 20A may have a front surface height $H_{FA}$, which is the distance from the plane of movement of the second cleaving wedge 20B, and the lowest point of the first front surface $S_{FA}$. In a preferred embodiment, front surface height $H_{FA}$ is less than the adhesive height $H_A$.

Figure 5H:
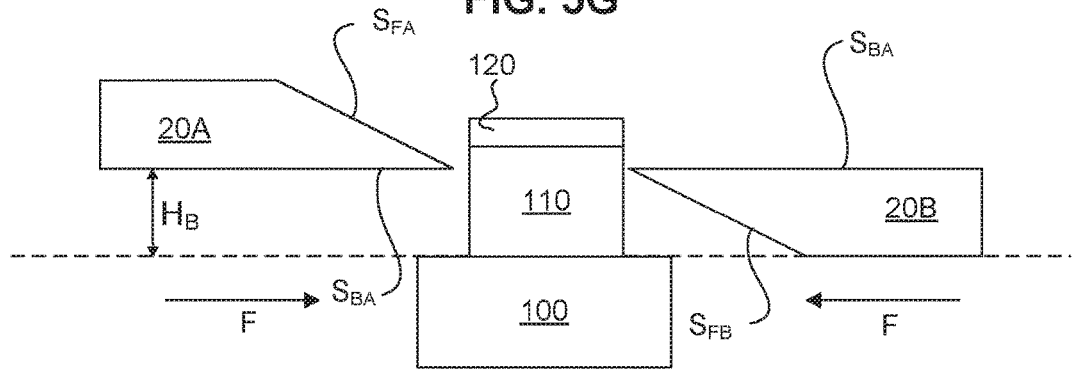

FIG. 5H depicts the first cleaving wedge 20A and second cleaving wedge 20B exhibiting substantially similar shapes. The first cleaving wedge 20A has a first front surface $S_{FA}$, and a bottom surface $S_{BA}$. The first front surface $S_{FA}$ is inclined, meeting a first bottom surface $S_{BA}$ at an angle less than 90°, more preferably at an angle less than 30° and even more preferably at an angle less than 15°. In the illustrated embodiment, the front surface $S_{FA}$ is substantially flat. In the illustrated embodiment, the bottom surface $S_{BA}$ is substantially parallel to the plane of cleaving, however head pivot 16 may allow the first cleaving wedge 20A to be inclined or declined with respect to the plane. The second cleaving wedge 20B has a second front surface $S_{FB}$, and a second bottom surface $S_{BB}$. The second front surface $S_{FB}$ is inclined, meeting bottom surface $S_{BB}$ at an angle less than 90°, more preferably at an angle less than 30° and even more preferably at an angle less than 15°. In the illustrated embodiment, the second front surface $S_{FB}$ is substantially flat. In the illustrated embodiment, the second bottom surface $S_{BB}$ is substantially parallel to the plane of cleaving, however head pivot 16 may allow the first cleaving wedge 20A to be inclined or declined with respect to the plane. In the illustrated embodiment, the second bottom surface $S_{BB}$ is oriented in the opposite direction of the first bottom surface $S_{BA}$. The first cleaving wedge 20A and second cleaving wedge 20B are staggered aligned along a plane, such that when they move with respect to each other they remain on different planes that are substantially parallel to each other. This may be achieved when the first arm 10A and the second arm 10A are different in length. The difference in the plane may be represented by base height $H_B$, which is preferably smaller than the adhesive height $H_A$. In some embodiments, the base height $H_B$ may be selected so that the first bottom surface $S_{BA}$ is above the second bottom surface $S_{BB}$, so that the first cleaving wedge 20A and second cleaving wedge 20B do not come into direct contact. In other embodiments, the base height $H_B$ may be selected so that the first bottom surface $S_{BA}$ is below the second bottom surface $S_{BB}$, so that the first cleaving wedge 20A and second cleaving wedge 20B meet when the apparatus is closed.

Figure 6A:
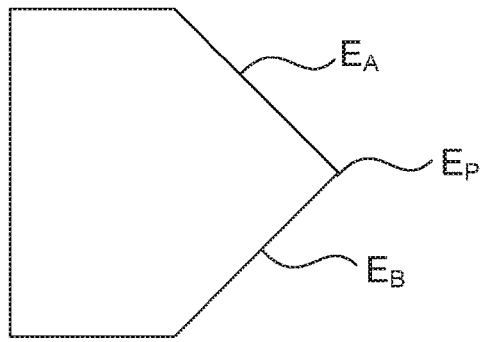
FIGS. 6A-6F represent a top view depicting multiple embodiments of the front surface of the cleaving wedge, according to an example embodiment.

FIGS. 6A to 6F illustrate a top view of embodiments of the front surface $S_F$ of first cleaving wedge 20A and second cleaving wedge 20B, referred to below as a cleaving wedge 20. FIG. 6A illustrates the cleaving wedge 20 having a first angled lead edge $E_A$ and a second angled lead edge $E_B$, coming to a leading point $E_P$. Additionally, while first angled lead edge $E_A$ and second angled lead edge $E_B$ are depicted as substantially flat, a curvature may be incorporated.

Figure 6B:
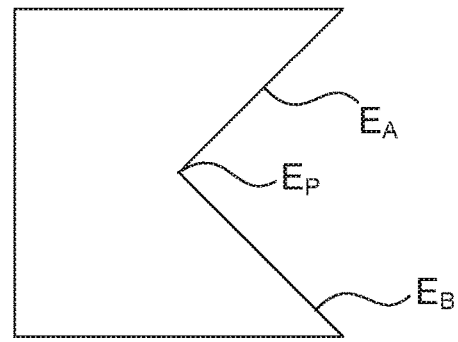

FIG. 6B illustrates the cleaving wedge 20 having a first angled lead edge $E_A$ and a second angled lead edge $E_B$, coming to a trailing point $E_P$. Additionally, while first angled lead edge $E_A$ and second angled lead edge $E_B$ are depicted as substantially flat, a curvature may be incorporated.

Figure 6C:
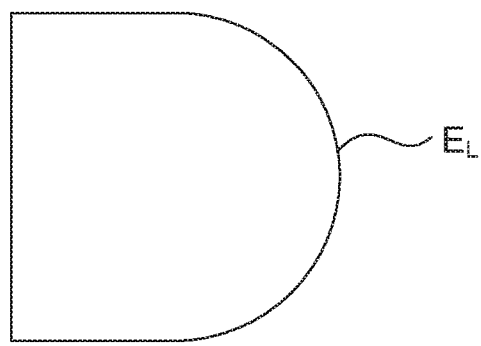
Figure 6D:
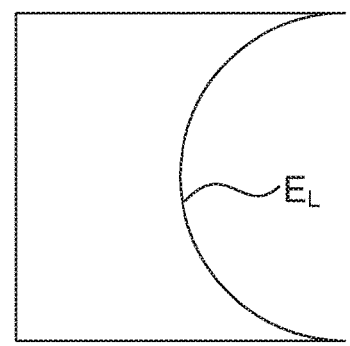

FIGS. 6C and 6D illustrates the cleaving wedge 20 having a curved lead edge $E_C$. For example, FIG. 6C depicts the curved lead edge $E_C$ having a convex shape, while FIG. 6D depicts the curved lead edge $E_C$ having a concave shape.

Figure 6E:
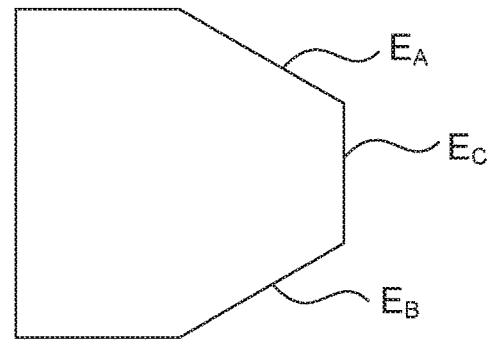

FIG. 6E illustrates the cleaving wedge 20 having a first angled lead edge $E_A$ and a second angled lead edge $E_B$, coming to a leading edge $E_L$. Additionally, while leading edge $E_L$, first angled lead edge $E_A$ and second angled lead edge $E_B$ are depicted as substantially flat, a curvature may be incorporated.

Figure 6F:
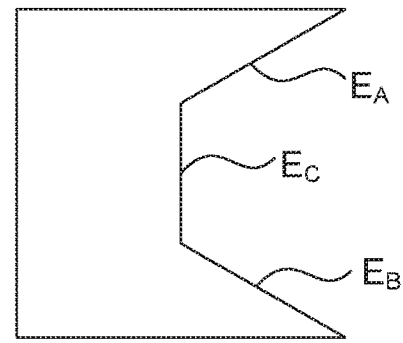

FIG. 6F illustrates the cleaving wedge 20 having a first angled lead edge $E_A$ and a second angled lead edge $E_B$, coming to a leading edge $E_L$. Leading edge, first angled lead edge $E_A$ and second angled lead edge $E_B$ may be designed similar to the cross sectional embodiments depicted in FIGS. 5A to 5H. Additionally, while leading edge $E_L$, first angled lead edge $E_A$ and second angled lead edge $E_B$ are depicted as substantially flat, a curvature may be incorporated.

FIGS. 7A-7D show various embodiments of a cleaving wedge having a heating element 40, supplied with current by an electrical connection 30, to be used in conjunction with the embodiments of cleaving tool 1 depicted in FIGS. 2A, 2B and 4. FIG. 7A depicts a side view of the cleaving wedge 20, wherein the heating element 40 enters the back of the cleaving wedge 20, passes along the bottom surface to the leading edge $E_L$ of the cleaving wedge 20, and back to the back of the cleaving wedge 20 to complete the electrical circuit. In such an embodiment, the heating of the cleaving wedge 20 is primarily to the bottom surface and leading edge $E_L$, however all portions of the cleaving wedge 20 will experience varying degrees of heating, based on the material used.

FIG. 7B depicts a side view of the cleaving wedge 20, wherein the heating element 40 enters the back of the cleaving wedge 20, passes along the front surface to the leading edge $E_L$ of the cleaving wedge 20, and back to the back of the cleaving wedge 20 to complete the electrical circuit. In such an embodiment, the heating of the cleaving wedge 20 is primarily to the front surface and leading edge $E_L$, however all portions of the cleaving wedge 20 will experience varying degrees of heating, based on the material used.

FIG. 7C depicts a top view of the cleaving wedge 20, wherein the heating element 40 enters the back of the cleaving wedge 20, and makes a single pass along the front of the cleaving wedge 20, before returning to the back of the cleaving wedge 20 to complete the electrical circuit. In such an embodiment, the heating of the cleaving wedge 20 is primarily to the leading edge $E_L$, however all portions of the cleaving wedge 20 will experience varying degrees of heating, based on the material used.

FIG. 7D depicts a top view of the cleaving wedge 20, wherein the heating element 40 enters the back of the cleaving wedge 20, and makes multiple pass in the front of the cleaving wedge 20, before returning to the back of the cleaving wedge 20 to complete the electrical circuit. In such an embodiment, the cleaving wedge 20 may experience a relatively uniform heating, as the heating element 40 is distributed throughout the cleaving wedge 20.

Figure 8A:
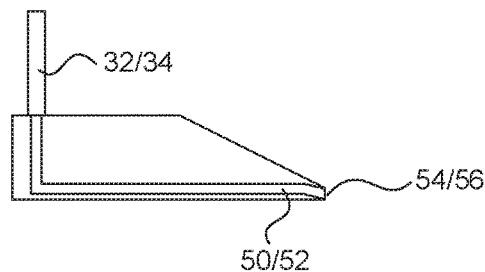
FIGS. 8A, 8B, 8E and 8F represent a cross-sectional view depicting multiple embodiments of a solvent feed and collection system with respect to the cleaving wedge, according to an example embodiment.
Figure 8B:
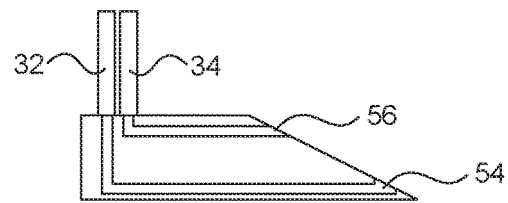
Figure 8C:
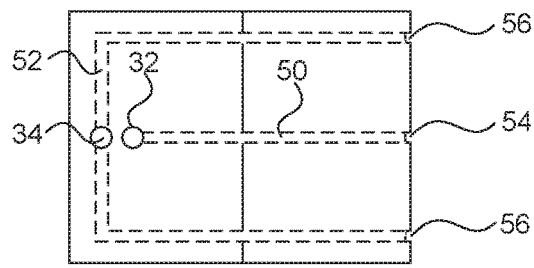
FIGS. 8C, 8D, 8G and 8H represent a top view depicting multiple embodiments of a solvent feed and collection system with respect to the cleaving wedge, according to an example embodiment.

FIGS. 8A-8H show various embodiments of a cleaving wedge 20 having a solvent distribution, fluidly connected to solvent supply 32 by solvent supply 50, and solvent collection 56, fluidly connected to solvent return 34 by solvent return 52, to be used in conjunction with the embodiments of cleaving tool 1 depicted in FIGS. 3A and 3B and 4. FIG. 8A depicts a side view where the solvent distribution 54 and solvent collection 56 both occur at the leading edge $E_L$ of the cleaving wedge 20, and are fluidly connected to solvent supply 32 and solvent return 34 by solvent supply 50 and solvent return 52, respectively. FIG. 8C depicts a possible top view of the same embodiment. In such an embodiment, solvent may be distributed from the center, and collected on the edges, or vice versa.

Figure 8D:
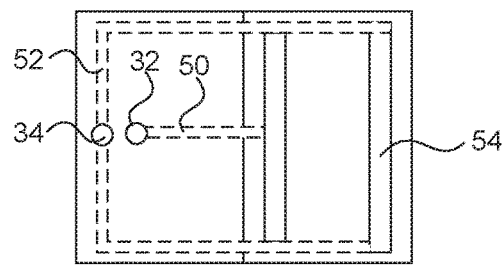

FIG. 8B depicts a side view where the solvent distribution 54 is located on the leading edge $E_L$ of the cleaving wedge 20, and solvent collection 56 is located at a posterior position on the front surface $S_F$, thereby allowing the solvent to traverse up the front surface during operation and before collection and removal. FIG. 8D depicts a possible top view of the same embodiment. In such an embodiment, solvent may be distributed evenly using a trench at the leading edge $E_L$, and a trench at the posterior position of the front surface extends laterally across the front surface in order to collect any solvent that traverses up the front face.

Figure 8E:
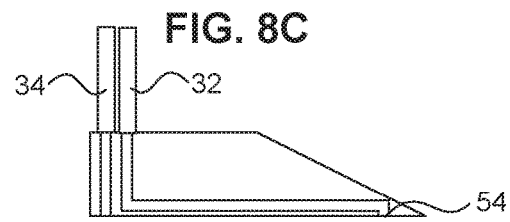

FIG. 8E depicts a side view depicts a side view where solvent distribution 54 is located near the leading edge $E_L$ of the cleaving wedge 20, and solvent collection 56 is located at a posterior position on the bottom surface, thereby allowing the solvent to traverse along the bottom surface during operation and before collection and removal. FIG. 8G depicts a possible top view of the same embodiment. In such an embodiment, solvent may be distributed evenly using a trench at or near the leading edge $E_L$, and a trench at the posterior position of the bottom surface extends laterally across the bottom surface in order to collect any solvent that traverses up the front face.

Figure 8F:
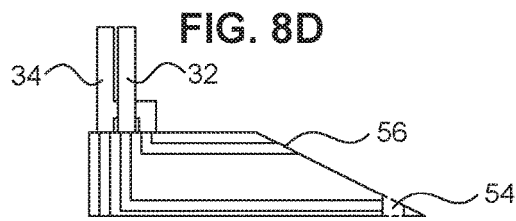
Figure 8G:
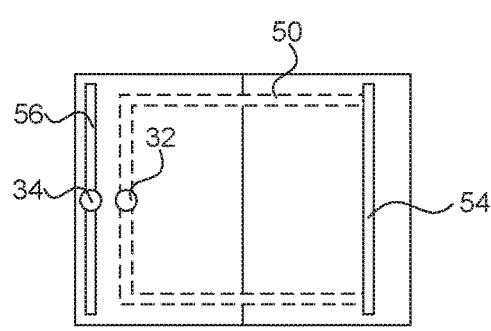
Figure 8H:
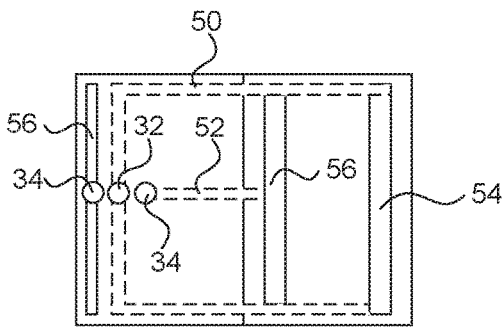

FIG. 8F depicts a side view depicts where solvent distribution 54 is located near the leading edge $E_L$ of the cleaving wedge 20, and solvent collection 56 is a located at a posterior position on the bottom surface and front service, thereby allowing the solvent to traverse along the front surface, as well as the bottom surface, during operation and before collection and removal. FIG. 8H depicts a possible top view of the same embodiment. In such an embodiment, solvent may be distributed evenly by solvent distribution 54, which may be a trench, at or near the leading edge $E_L$, and a trench at the posterior position of the front surface, and the bottom surface, extends laterally in order to collect any solvent that traverses up the front face.

Figure 9A:
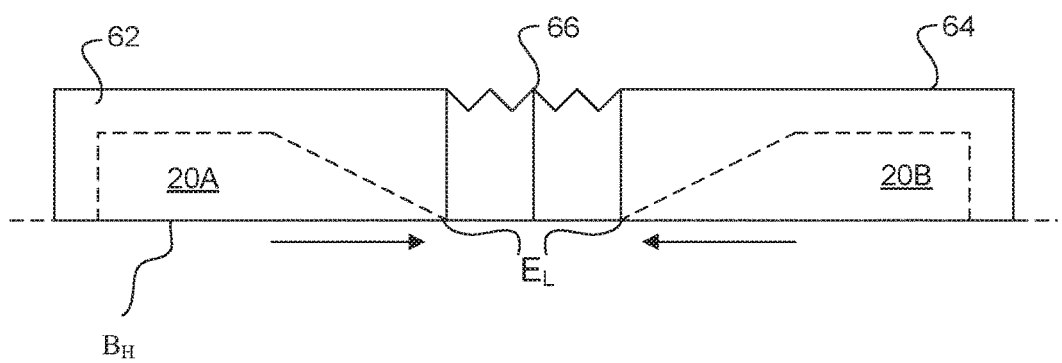
FIGS. 9A and 9B represent a cross-sectional view depicting a solvent hood enveloping the cleaving wedge, according to an example embodiment.
Figure 9B:
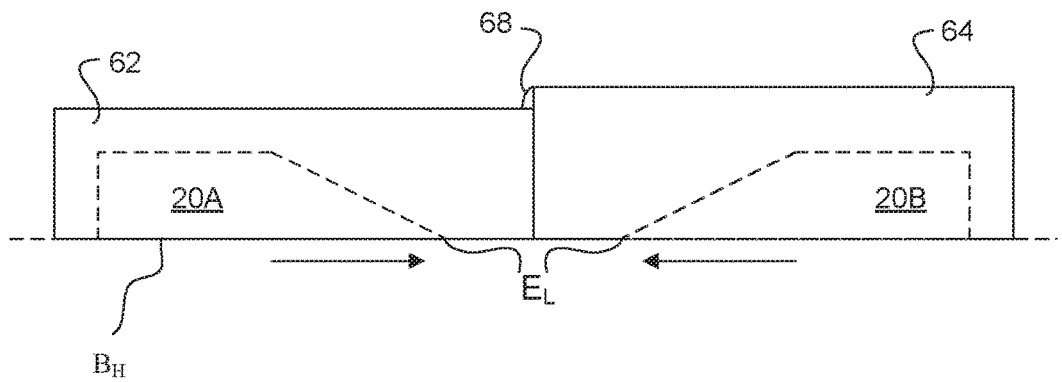

FIGS. 9A and 9B show optional embodiments for a solvent hood 60, to be used in conjunction with the embodiments of cleaving tool 1 depicted in FIGS. 3A and 3B and 4. The solvent hood 60 may be used in instances where the solvent selected may have adverse health effects, and containment of vaporized solvent is required. FIG. 9A depicts a solvent hood 60, where a first hood 62 is located above the first cleaving wedge, and a second hood 64 is located above the second cleaving wedge. In this embodiment, the cleaving tool contains the solvent using a collapsible section 66 located between the first hood 62 and second hood 64, which cover the entirety of the solvent system when the cleaving tool 1 is in operation. In the current embodiment, the first hood 62 and second hood 64 have similar dimensions, and thus explanation of the first hood 62 applies to the second hood 64. The base $B_H$ of the first hood 62 may be located co-planar, or substantially co-planar, to the bottom surface of the first cleaving wedge. While not shown in the current embodiment, the base $B_H$ of the first hood 62 may contain a seal, or lubricating layer, to maintain a sealed enclosure between the first hood 62, second hood 64, collapsible section 66 and first object 100. The collapsible section 66 is designed such that it allows the cleaving tool 1 to fully close, such that the first cleaving wedge 20A and second cleaving wedge 20B at least come into contact, or even overlap, with each other. Further, in some embodiments the front edge of the first hood 62 may be located directly above the leading edge $E_L$ of the first cleaving wedge, whereby the first hood 62 and second hood 64 are in direct contact when the first cleaving wedge and second cleaving wedge are in contact. In additional embodiments, the front edge of the first hood 62 is located at a point posterior to the leading edge $E_L$ of the first cleaving wedge, thereby allowing the first cleaving wedge to overlap the second cleaving wedge.

FIG. 9B depicts a solvent hood 60, where a first hood 62 is located above the first cleaving wedge, and a second hood 64 is located above the second cleaving wedge. In this embodiment, the cleaving tool 1 contains the solvent using an overlap between the first hood 62 and second hood 64, which cover the entirety of the solvent system when the cleaving tool 1 is in operation. In the current embodiment, the first hood 62 is slightly smaller than the second hood 64, and a sealing liner fills the gap created by the first hood 62 and the second hood 64. The base $B_H$ of the first hood 62 and second hood 64 may be located co-planar, or substantially co-planar, to the bottom surface of the first cleaving wedge. While not shown in the current embodiment, the base BH of the first hood 62 may contain a seal, or lubricating layer, to maintain a sealed enclosure between the first hood 62, second hood 64, collapsible section 66 and first object 100. The first hood 62 and second hood 64 are designed such that they overlap, and allow the cleaving tool 1 to fully close, such that the first cleaving wedge 20A and second cleaving wedge 20B at least come into contact, or even overlap, with each other.

Figure 10:
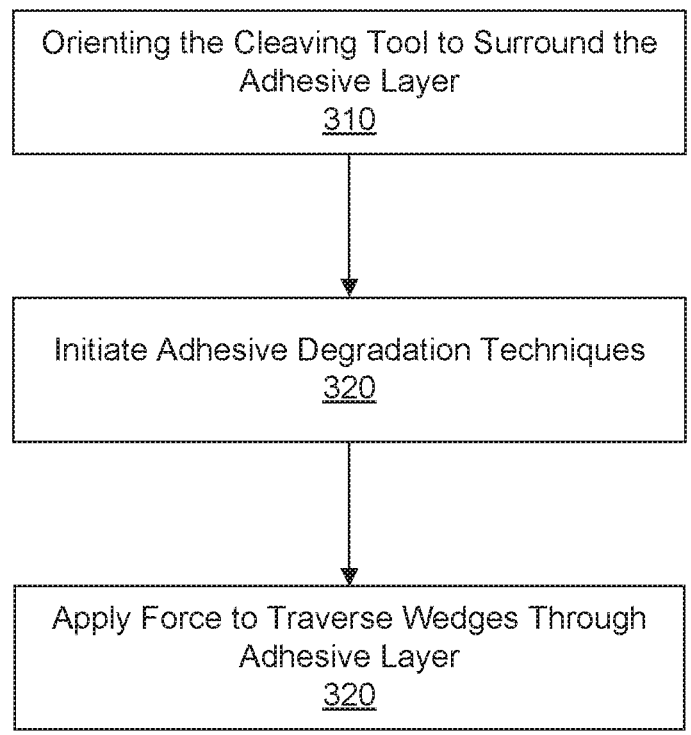
FIG. 10 represents the method steps of removing a first object from a second object by cleaving the adhesive layer, according to an example embodiment.

FIG. 10 is a method for separation of the first object 100 from the second object 120, using cleaving tool 1 to separate the bond created by the adhesive layer 110. Step 310 includes orienting the cleaving tool 1 such that the first cleaving wedge 20A is located on one side of the adhesive layer 110, and the second cleaving wedge 20B is located on the opposite side of the adhesive layer 110. Additionally, if cleaving tool 1 contains the optional embodiments depicted in FIGS. 9A and 9B, cleaving tool 1 is oriented such that the first hood 62 and the second hood 64 are in direct contact with the first object 100, thereby creating a seal between the first hood 62, the second hood 64 and the first object 100. This isolates the first cleaving wedge 20A, second cleaving wedge 20B, adhesive layer 110 and second object 120 from a user, so any chemical constituents used, or created, by separating the first object 100 from the second object 120 would not contact the user.

Step 320 includes initiating adhesive loosening techniques. In one embodiment, the adhesive loosening technique may include supplying current to a heating element 40 located in the first cleaving wedge 20A and the second cleaving wedge 20B using, for example, the cleaving wedge 20 embodiments depicted in FIGS. 7A-7D. In an additional embodiment, the adhesive loosening technique may include initiating supply of the solvent, as well as return of the solvent, to the first cleaving wedge 20A and the second cleaving wedge 20B using, for example, the cleaving wedge 20 embodiments depicted in FIGS. 8A-8H. Further, adhesive loosening techniques may include a combination of the two.

Step 330 includes applying a force to the first arm, the second arm, or both, to move the first cleaving wedge and second cleaving wedge together. This forces the first cleaving wedge and the second cleaving wedge through the adhesive layer 110, thereby separating the first object 100 from the second object 120. The loosening techniques initiated in step 320 may degrade the chemical bond in the adhesive layer 110 by dissolving, or reacting, a solvent creating a weakened chemical bond, thereby allowing the first cleaving wedge and second cleaving wedge to pass through the adhesive layer 110 using less force. Additionally, the use of heat may reduce the strength of the adhesive layer 110, thereby allowing the first cleaving wedge and second cleaving wedge to pass through the adhesive layer 110 using less force.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

What is claimed is:

1. A cleaving apparatus, wherein the apparatus comprises:
   a first arm having a first cleaving wedge, wherein the first cleaving wedge comprises a first front surface and a first bottom surface, and wherein the first front surface is oriented away from the first bottom surface;
   a second arm having a second cleaving wedge, wherein the second cleaving wedge comprises a second front surface and a second bottom surface, and wherein the second front surface is oriented away from the second bottom surface;
   the first arm and the second arm arranged to move with respect to each other;
   a heating apparatus located in the first cleaving wedge; and
   a solvent feed system located in the second cleaving wedge, wherein the solvent feed system distributes solvent to the second front surface of the second cleaving wedge.

2. The apparatus of claim 1, further comprising:
   a pivot connection attaching the first arm and the second arm;
   a first handle attached to the first arm, wherein the first handle and first cleaving wedge are located on opposite ends of the pivot connection; and
   a second handle attached to the second arm, wherein the second handle and second cleaving wedge are located on opposite ends of the pivot connection.

3. The apparatus of claim 1, wherein the heating apparatus comprises a heating element.

4. The apparatus of claim 1, wherein the heating apparatus comprises an enclosed fluid conveying system, wherein the fluid conveying system transports a heat transfer fluid through the first cleaving wedge.

5. The apparatus of claim 1, wherein the heating apparatus is located at least at a front portion of the first cleaving wedge.

6. The apparatus of claim 1, wherein the first bottom surface is located on a first plane, and the second bottom surface is located on a second plane, and wherein the first plane is parallel to the second plane.

7. The apparatus of claim 6, wherein the first plane and second plane are co-planar.

8. The apparatus of claim 1, wherein the first front surface faces opposite different direction of the second front surface.

9. The apparatus of claim 1, wherein an angle of inclination between the first front surface and the first bottom surface is less than or equal to 30°.

10. The apparatus of claim 1 further comprising a leading surface located between the first front surface and the first bottom surface.

11. The apparatus of claim 10, wherein an angle of inclination between the leading surface and first bottom surface is 90°.

12. The apparatus of claim 11, wherein the leading surface is convex.

13. The apparatus of claim 10, wherein an angle of inclination between the leading surface and first bottom surface is greater than 90°.

14. The apparatus of claim 13, wherein the heating element is located between the leading surface and the first front surface.

15. The apparatus of claim 10, wherein an angle of inclination between the leading surface and bottom surface is less than 90°.

16. The apparatus of claim 15, wherein the heating element is located between the leading surface and the first bottom surface.

17. The apparatus of claim 1, wherein the first front surface has a leading edge located at a front portion of the cleaving wedge, and wherein the leading edge is curved.

18. The apparatus of claim 1, wherein the first front surface has a leading edge located at a front portion of the cleaving wedge, and wherein the leading edge is comprising more than 1-line segment.

19. The apparatus of claim 1 further comprising a first solvent hood located above the first cleaving wedge and a second solvent hood located above the second cleaving wedge, wherein the first solvent hood and the second solvent hood have substantially similar dimensions, and wherein a collapsible section is located between a front edge of the first solvent hood and a front edge of the second solvent hood.

20. The apparatus of claim 1 further comprising a first solvent hood located above the first cleaving wedge and a second solvent hood located above the second cleaving wedge, wherein the first solvent hood is smaller than the second solvent hood.

* * * * *